United States Patent [19]

Miller, Jr. et al.

[11] Patent Number: 4,908,168

[45] Date of Patent: Mar. 13, 1990

[54] METHOD FOR SMALL SCALE FORMING OF HARDENABLE MATERIALS OF ORGANIC ORIGIN

[75] Inventors: Theodore E. Miller, Jr.; Tonja R. Sutton, both of Midland, Mich.; Charles J. Latta, Hanover Park, Ill.

[73] Assignee: The Dow Chemical Company, Midland, Mich.

[21] Appl. No.: 160,444

[22] Filed: Feb. 25, 1988

Related U.S. Application Data

[63] Continuation-in-part of Ser. No. 67,837, Jun. 29, 1987, abandoned, which is a continuation-in-part of Ser. No. 473,904, Mar. 10, 1983, abandoned.

[51] Int. Cl.$^4$ .............................................. B29C 45/13
[52] U.S. Cl. .................................. 264/40.1; 222/135; 222/642; 264/102; 264/328.6; 264/328.14; 264/328.17
[58] Field of Search ............... 425/547, 557, 560, 562, 425/567, 817 R; 264/40.1, 40.3, 102, 40.4, 328.6, 328.12, 328.14, 328.17; 222/26, 136, 642, 135

[56] References Cited

U.S. PATENT DOCUMENTS

| | | | |
|---|---|---|---|
| 2,862,239 | 12/1958 | Pollard et al. | 264/328.6 |
| 3,674,398 | 7/1972 | Baumgartner | 425/560 |
| 3,917,792 | 11/1975 | Conacher | 264/328.6 |
| 3,924,989 | 12/1975 | Althausen et al. | 425/817 R |
| 3,975,479 | 8/1976 | McClean | 264/102 |
| 3,984,510 | 10/1976 | Chandra et al. | 264/328.6 |
| 4,170,616 | 10/1979 | Jebens | 264/102 |
| 4,309,373 | 1/1982 | Althausen et al. | 264/328.12 |
| 4,314,963 | 2/1982 | Boden et al. | 264/328.17 |

Primary Examiner—Jill L. Heitbrink
Attorney, Agent, or Firm—Thomas D. Zindrick; Bruce M. Kanuch

[57] ABSTRACT

Material is supplied to a mold by direct application of gas pressure to a liquid material. A method for the shaping of at least two different synthetic resinous materials by providing a predetermined quantity of up to about 100 cm$^3$ of a first material in a first material reservoir and a second material in a second material reservoir, the first and second material reservoirs each being in communication with a discharge line having a sufficiently narrow inner diameter such that each reactive quantity may, when propelled by sufficient gas pressure, be propelled in plug flow and each discharge line being in communication with a mold; introducing into each of the first and second gas reservoirs a predetermined volume of a gas at predetermined gas pressures sufficient to propel each quantity of material as turbulently flowing plug into the mold.

14 Claims, 1 Drawing Sheet

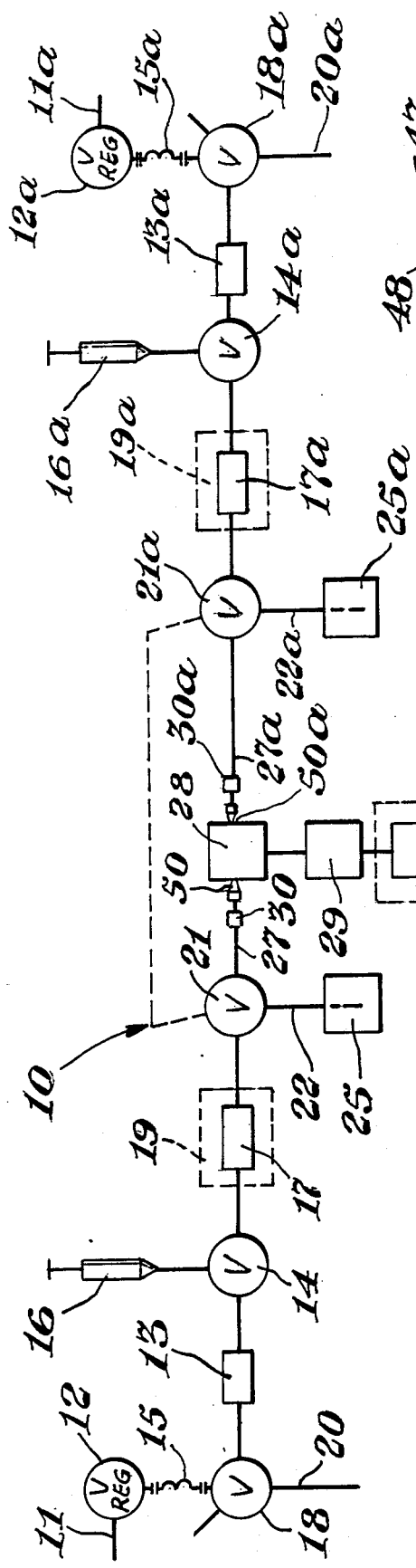
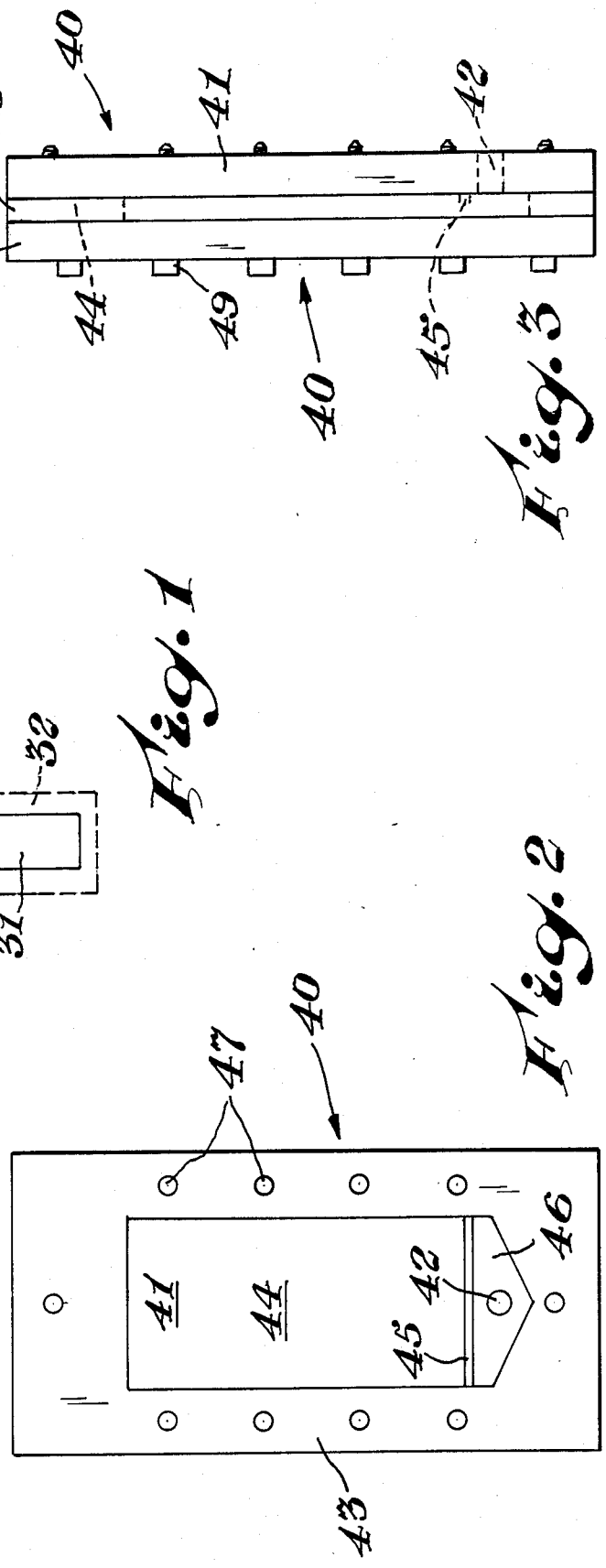
Fig. 1
Fig. 2
Fig. 3

METHOD FOR SMALL SCALE FORMING OF HARDENABLE MATERIALS OF ORGANIC ORIGIN

This application is a continuation-in-part of copending application Ser. No. 067,837 filed Jun. 29, 1987, to be abandoned, which is a continuation-in-part of application Ser. No. 473,904 filed Mar. 10, 1983, now abandoned.

A substantial and significant problem which has faced researchers in the field of hardenable organic materials such as thermoplastic and thermosetting organic compositions, has been in evaluation of small quantities of material which in essence have been prepared on bench scale wherein the quantity of the material is relatively small. In many instances in the formation and evaluation of thermoplastic materials, compression moldings have been employed for initial evaluation. Such compression moldings, however, when employed to evaluate a material intended for injection molding, provide information which is barely indicative of the characteristics one might expect from an injection molded sample. A similar problem exists wherein materials are being developed for extrusion into sheet film filaments and the like. The problem concerned with evaluation of materials for the forming of filaments is much less acute than in the area of extrusion or injection molding. A particularly difficult area for evaluation of materials is in the field of reaction injection molding. By the term reaction injection molding is meant a process wherein two or more reactive organic chemical species are combined rapidly and the resultant mixture is forced into a mold where the polymerization reaction between the species is more or less completed and a solid object resulting from the reaction of the reactive species may be removed from the mold. Particularly desirable materials for use in reaction injection molding process are the so-called polyurethane resins. Polyurethane resins usually are prepared by admixing a polyol with a multifunctional isocyanate to form a polyurethane resin which depending upon the choice of components may vary from a rubbery material to a relatively hard and brittle solid. By the appropriate choice of the isocyanate component, the polyol component temperature and reaction initiator, the curing time for such resins may be varied within wide limits. Some of such systems are known which react very rapidly and such rapid reacting systems have been employed with considerable benefit in the reaction injection molding process. In a reaction injection molding process, it is usually critical to maintain a relatively precise stoichiometric ratio of the components forming the resin. Also of considerable importance in the reaction injection molding process is intimate and thorough admixture of the components forming the resin.

In the evaluation of small scale formulation for reaction injection molded products utilizing quantities less than about 100 grams, considerable difficulty is encountered. Rapid and thorough mixing is generally difficult and the product obtained usually is a casting rather than an injection molding, the casting frequently being made in a small beaker or similar container. In the evaluation of compositions or formulations for the preparation of reaction injection molded products, it is desirable that very rapid and thorough mixing of the components be achieved and the mixed components be forced into a mold of a desired configuration. Experimental units suitable for such operations generally employ piston pumps with recycle loops and oftentimes are capable of using only a relatively small proportion of the components required to fill and maintain optimum operation of the molding system.

Often such a reaction injection molding apparatus operates on the principle of continuous recirculation for the reactive components and on demand forces predetermined quantities of the reactive components into a mixing head or chamber which discharges into a mold of the desired configuration. Generally the available apparatus for experimental injection molding requires the use of gallons of reactive components, rather than the grams of reactive components which are generally prepared on a laboratory scale. Generally reaction injection molding equipment and extrusion equipment require parts which are specifically fabricated to form a specific machine. When such a machine is assembled, alteration thereof frequently requires significant time, labor and materials to provide such desired alterations.

It would be desirable if there were available an improved method and apparatus for the formation of shaped articles from hardenable organic resinous materials.

It would also be desirable if there were available a simplified method and apparatus for the preparation of reaction injection molded synthetic resinous materials.

It would also be desirable if there were available an improved method and apparatus for the formation of shaped articles from synthetic resinous materials which would employ minimal quantities of such materials and such apparatus would employ a minimal number of specialized components.

SUMMARY OF THE INVENTION

These benefits and other advantages in accordance with the present invention are achieved in an apparatus for the molding of at least two different synthetic resinous materials, the apparatus comprising in cooperative combination for molding about 100 $cm^3$, or gm, quantities of each reacted material, a first and second source of gas under pressure, first and second material storage reservoirs each having a material storage inlet and a material storage outlet, the material storage inlets being in communication with said first and second sources of gas, the material storage outlets being in communication with first and second discharge means, said first and second discharge means comprising a discharge line having sufficiently narrow inner diameters such that each reactive quantity may, when propelled by gas under pressure, move in plug flow, and each discharge means being in communication with a shaping means.

Also contemplated within the scope of the present invention is a method for the shaping of at least two different synthetic resinous materials, which comprises the following: providing a predetermined quantity of up to about 100 $cm^3$ of a first material in a first reservoir and a second material a second material reservoir, said first and second material reservoirs being in communication with first and second discharge means, said first and second discharge means each comprising a discharge line having sufficiently narrow inner diameters such that each reactive quantity may, when propelled by sufficient gas pressure, be propelled in plug flow and each discharge means being in communication with a shaping means; introducing into each of the first and second gas reservoirs a predetermined volume of a gas at predetermined gas pressures sufficient to propel each quantity of material as turbulently flowing plug into the shaping means.

BRIEF DESCRIPTION OF THE DRAWINGS

Further features and advantages of the present invention will become more apparent from the following specification taken in connection with the drawing wherein:

FIG. 1 is a schematic representation of an apparatus in accordance with the invention;

FIG. 2 is a view of a mold suitable for use in the practice of the present invention wherein one side of the mold has been removed;

FIG. 3 depicts a side view of a mold such as the mold of FIG. 2 wherein both sides of the mold are present and the shaping cavity defined.

DETAILED DESCRIPTION

In FIG. 1 there is schematically depicted an apparatus in accordance with the present invention generally designated by the reference numeral 10. The apparatus 10 comprises in cooperative combination a first source of gas under pressure designated by the reference numeral 11 and a second source of gas under pressure designated by the reference numeral 11a. The gas sources 11 and 11a are in operating communication with first and second gas pressure regulating means 12 and 12a, respectively. Third and fourth three-way valves 18 and 18a, respectively, are in selective communication with the first and second gas pressure regulating means 12 and 12a, respectively, via first and second capillary tubes 15 and 15a, respectively. Third and fourth three-way valves 18 and 18a are also in selective communication with first and second vent lines 20 and 20a, respectively. Finally, third and fourth three-way valves 18 and 18a are in constant communication with first and second gas reservoirs 13 and 13a, respectively.

The first and second gas reservoirs 13 and 13a are in selective communication with first and second three-way valves 14 and 14a, respectively. First and second three-way valves 14 and 14a are also in selective communication with first and second material supply means 16 and 16a, respectively. The first and second three-way valves 14 and 14a are in constant communication with first and second material reservoirs 17 and 17a, respectively. First and second material reservoirs 17 and 17a are in operative association with first and second temperature control means 19 and 19a, respectively. Material reservoirs 17 and 17a are in constant communication with associated fifth and sixth three-way valves 21 and 21a, respectively. Fifth and sixth three-way valves each provides selective communication with a calibration means. Examplary calibration means include a first and second calibration means which comprise first and second external discharge means 22 and 22a in association with first and second receivers 25 and 25a, respectively. Fifth and sixth three-way valves are each in selective communication with discharge means. Discharge means comprises first and second delivery lines 27 and 27a and, optionally, nozzles 50 and 50a. Discharge means terminate in a mixing head 28. First and second pressure transducers 30 and 30a, respectively, are positioned along the first and second delivery lines 27 and 27a, respectively.

The mixing head 28 in turn is in communication with a gas disentrainment chamber 29. The gas disentrainment chamber 29 in turn is in communication with a shaping means 31. Shaping means 31 has in operative association therewith a temperature control means 32.

In operation of the apparatus 10, as seen in FIG. 1 initially a predetermined quantity of a first material is discharged from the first material supply means 16 through the first three-way valve 14 into the first material reservoir 17, which is maintained at a desired temperature by means of first temperature control means 19. Similarly a predetermined quantity of a second material from second material supply means 16a is passed through second three-way valve 14a into second material reservoir 17a which is maintained at a desired temperature by means of second temperature control means 19a. Gas under pressure is provided to the first and second gas reservoirs 13 and 13a from the first and second gas pressure regulators 12 and 12a, respectively. Third three way valve 18 is selectively set such that the gas is passed from the first gas pressure regulator 12 to the first gas reservoir 13 through first capillary tube 15. Similarly fourth three way valve 18a is selectively set such that the gas is passed from the second gas pressure regulator 12a to the second gas reservoir 13a through second capillary tube 15a.

A desired pressure of gas is obtained in each of the first and second gas reservoirs 13 and 13a. The fifth and sixth three way valves 21 and 21a are set to provide communication between the first and second material reservoirs 17 and 17a, respectively, and the first and second external discharge means 22 and 22a, respectively. The first and second three-way valves 14 and 14a are then opened to provide communication between the first and second gas reservoirs 13 and 13a and the first and second material reservoirs 17 and 17a, respectively. Material is discharged from the first and second material reservoirs 17 and 17a, respectively, into the first and second receivers 25 and 25a, respectively. The quantity of material in the first and second receivers 25 and 25a is then determined and the foregoing procedure repeated if necessary with adjustment of the volume of material reservoir 17 or 17a until the desired ratio of materials is obtained in said receivers.

Once the desired ratio of materials is obtained in the first and second receivers 25 and 25a, the foregoing procedure is repeated with the exception that the fifth and sixth valves 21 and 21a are adjusted to prevent the discharge of material from the first and second materials reservoirs 17 and 17a, respectively, and gas pressure is applied thereto through first and second three-way valves 14 and 14a respectively. When this has been accomplished, the fifth and sixth valves 21 and 21a are simultaneously opened to provide communication between first and second material reservoirs 17 and 17a and the mixing head 28.

Thus, according to the present invention, gas under pressure will, upon discharge, act directly against the reactant materials from the first and second material reservoirs 17 and 17a, respectively. In order to attain highly reproducible results, each reactant must be simultaneously propelled in plug flow, whereby the gas and liquid zones will not substantially intermix. Moreover, the reactants should each enter the mixing head 28 in turbulent flow to acheive intimate admixture. A controlled rate of gas continues exiting from the first and second sources of gas pressure 11 and 11a, via first and second gas pressure regulating means 12 and 12a, respectively. Advantageously, the shaping means 31 should have a sufficient internal volume to be substantially filled by the reactive quantities of the materials.

The mold filling operation is completed by selectively setting third and fourth three way valves 18 and 18a in order to block passage of gas from first and second gas pressure regulating means 12 and 12a, respectively, and to vent first and second gas reservoirs 13 and 13a via first and second vent lines 20 and 20a, respectively.

Given the teachings above, the selection of operating conditions will be obvious to one of ordinary skill in the art. The following is a general discussion of the criteria to be considered.

By "flowing plug", it is meant that the reactant material moves as a generally continuous mass. The forces associated with surface tension and wetting tend to maintain the liquid in a continuous mass. Generally, when moving liquids in closed systems, the forces associated with surface tension and wetting are inversely proportional to the inner diameter of the system. For the purposes of this invention, it is required that the inner diameter of the fifth and sixth three way valves 21 and 21a, and the delivery means, e.g., first and second delivery lines 27 and 27a, and, if employed, nozzles 50 and 50a; should be sufficiently relatively narrow to maintain the reactants in generally plug form. Generally the diameter should be between about 0.3 centimeters (cm) and about 0.7 cm. When the diameters employed are greater than about 1 cm, gas and liquid zones intermix within the tubing.

By "turbulent flow" is meant fluid flow in which the velocity at a given point varies erratically in magnitude and direction. In moving liquid in relatively narrow-diameter passages however, it becomes more difficult to achieve turbulent flow. When surface to volume ratios of the materials are high, it becomes easier to maintain continuous liquid masses but consequently requires large velocities to attain the desired turbulent conditions.

Turbulence is expressed in terms of a Reynold's number. Turbulent flow is required because rapid mixing depends upon adjacent differential velocities or fluid shear. Reynold's number is a well-known relationship defined as the ratio of the product of the density of a fluid, its flow velocity, and a dimension of the container to the viscosity. Generally, turbulent flow is achieved when the Reynold's number is greater than 2000.

As is known to the artisan, turbulent flow at the mixing head 28 will be attained by (1) propelling the plug at a sufficiently high velocity in the delivery lines prior to the mixing head or; (2) if a sufficient velocity is not achieved in the delivery tubes, propelling the plug through nozzles 50 and 50a, which have suitable configurations. By "suitable configuration" it is meant, for example, that the nozzle will generally have an inner diameter which is narrower than the inner diameter of the delivery line with which it is in communication. Generally, the nozzle will control the orifice size at the mixer head.

As should be apparent, the velocity will be dependent upon the particular discharge means employed. Generally to achieve turbulent flow at the point of exiting from the discharge means when the discharge means comprises only a delivery line, the reactants will each be propelled at a velocity in the discharge lines of at least about 50 meters/sec. When a nozzle is employed, the velocity of each reactant in the discharge lines should generally be at least about 5 meters/sec. and will, of course, depend upon the configuration of the nozzle.

An important aspect of the present invention is that the velocities of the first and second reactive quantities, in plug form, are monitored by first and second pressure tranducers 30 and 30a, respectively. The transducers 30 and 30a are located in first and second delivery lines 27 and 27a, respectively. The pressure transducers follow the arrival and duration of the shots entering the mixing head 28, which enables the individual adjustment of the pressure on each quantity of material in the first and second material reservoirs 17 and 17a, respectively. The pressure applied on each quantity of material is adjusted such that the materials overlap when contacting each other. Suitable pressure transducers include strain gauge, balanced bridge transducers, because they can be mounted flush with the inner diameter of the delivery lines; such transducers, for example, may be slideably inserted into an access hole, which is subsequently sealed. "Overlap" is defined as the degree of coincidence of arrival and duration of both reactants. Substantially complete coincidence is essential for mixing quality and satisfactory properties in the molded article. Thus the present invention permits individual velocity control of the reactants which is particulary important when reacting materials of different viscosities, such as polyols and isocyanates.

Adequate velocity will be produced by, among other factors, the application of sufficient gas pressure to the liquid. "Sufficient" gas pressure is achieved when the force of the compressed air against each quantity of reactant is such that the reactants are propelled through the discharge means at a velocity sufficient to achieve turbulent flow at the mixing head, i.e., to cause uniform mixing of the reactants.

The pressure of the gas required and the force it exerts will be dependent upon the surface area, effective volume, and viscosity of the material discharged. For the present invention, the gas pressure should be between about 30 atmospheres (atm) and about 100 atm. If the gas pressure is less than about 20 atm, velocities are insufficient for adequate mixing and uniform part properties.

The first and second quantities of liquid must be in volume effective to be propelled, in plug flow, through the relatively small-diametered fifth and sixth valves 21 and 21a, respectively, and the delivery means. Generally, the volume of each reactant discharged from each materials reservoir will be up to about 100 cm$^3$, or grams (gm). Such a relatively small quantity is adequate for laboratory experiments, which is the primary utility contemplated for this invention.

Because the gas under pressure contacts the materials directly and is itself released into the mixing head, the material loaded into the reservoirs is reproducibly discharged into and mixed within the mixing heads. Furthermore, by contacting the materials directly, liquid accelerations are not impaired by the inertia of pistons, which are commonly employed in conventional mixing apparatus. A minor but reproducible proportion of material remains in the valves and the discharge means. Basically, the only material which is not discharged into the mixing heads is that material which adheres or wets to the inner walls of the valves and the discharge means. Such material is referred to as "hang up". The quantity of the hang up will depend upon and vary with the viscosity of each particular liquid material.

Therefore, a significant feature of the invention is that after each turbulent flowing plug has been propelled into the mixing head, the volume of liquid remaining in the tubing of the valves and discharge means is that which is hung up in the material reservoirs, valves and discharge lines. Moreover, this permits relatively consistent, reproducible results for each liquid employed. A calibration procedure shows a delivery reproducibility of about 1 percent.

To achieve intimate admixture it is necessary that the turbulent flowing plugs of reactant material are propelled generally directly at each other. Advantageously, the direction of approach should be about 180°±10°. If more than two material reservoirs are employed, then the angle should optimize the extent of direct, impinging contact.

After contacting in the mixing head, the materials, which are in a generally gas/liquid dispersion form, deposit in the gas disentrainment chamber 29. By "gas/liquid dispersion" it is meant that a sufficient volume of gaseous material is present in the composition such that the surfaces of the gas bubbles contact each other in an open or a closed cell structure. While in the gas disentrainment chamber, gas bubbles in the materials will rise in the head space above the liquid material. The gas disentrainment chamber 29 should be of a volume sufficiently larger than the combined volume of reactants to provide adequate surface area for a substantial volume of gas bubbles to dissipate from the materials.

When "sufficient" gas presssure is discharged from the first and second gas reservoirs 13 and 13a, residual gas will trail and exert pressure upon the gas/liquid dispersion deposited into the gas disentrainment chamber 29. Moreover, a controlled rate of gas continues exiting from the first and second sources of gas pressure 11 and 11a, via first and second gas pressure regulating means 12 and 12a, respectively. First and second capillary tubes 15 and 15a are employed to provide a slow reaccumulation of pressure in the system. This capillary-fed bleed gas, after a time, will provide sufficient pressure in the gas disentrainment chamber to discharge the material into the shaping means 31, such as a mold. The final step is to vent pressure in each of the first and second gas reservoirs 13 and 13a using third and fourth three-way valves 18 and 18a, respectively.

The apparatus 10, as depicted in FIG. 1, permits a choice of the rapid mixing of two reactive components in a desired ratio and discharge of such mixed components into a shaping means 31, such as a mold, or alternatively permits the injection of a single component into shaping means 31.

Although the schematic representation in FIG. 1 shows the use of only 2 material reservoirs together with associated gas, materials supply means and receivers for the purpose of calibration, the principles set forth in the operation of the apparatus 10 may be readily applied to the mixing of 3 or more components to provide a desired composition in the gas disentrainment chamber 29 and in the shaping means 31.

In FIG. 2 there is depicted a face view of a portion of a mold useful in the practice of the present invention generally designated by the reference numeral 40. The mold portion 40 comprises a first generally rectangular plate 41 having formed therein a material inlet 42. Detachably affixed to the rectangular plate 41 is a second plate 43 defining therein a mold cavity 44, breaker or distributor bar 45 extends across a generally rectangular cavity 44 adjacent the material inlet 42. The material inlet 42 discharges into a material receiving cavity 46 having the general configuration of a coat hanger. The plate 41 and plate 43 define a plurality of bolt openings 47, adapted to pass bolts therethrough.

In FIG. 3, there is depicted a view of the assembly 40 as depicted in FIG. 2 wherein a second side or facing plate 48 has been added thereto. A plurality of bolts 49, passing through bolt holes 47, threadably engage 41 to provide a mold having an enclosed cavity 44 of generally rectangular configuration.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for mixing of at least two different synthetic resinous materials, which comprises the following steps:
   (a) providing a predetermined volume of gas in a first gas reservoir and in a second gas reservoir at predetermined pressures of between about 30 atm. and 100 atm.,
   (b) providing a predetermined quantity of up to about 100 cm$^3$, or gm, of a first material in a first material reservoir and a second material in a second material reservoir, said first and second material reservoirs each having a material storage inlet and a material storage outlet; said first and second storage inlets being in communication with first and second discharge means, said first and second discharge means each comprising a respective first and second discharge line and a respective first and second pressure transducer, the discharge lines each having a sufficiently narrow inner diameter such that each quantity of the first and second materials, when propelled by the gas under pressure, moves in a plug flow;
   (c) introducing into each of the first and second material reservoirs the predetermined volume of the gas at the predetermined gas pressures which are sufficient to propel the quantities of the first and second materials in plug flow and to achieve turbulent flow prior to a shaping means;
   (d) propelling the plugs of the first and second turbulent flowing materials through the discharge lines at a generally directly opposite angle to cause an overlapping contact between the materials in a mixing head;
   (e) measuring the time and duration of the propelled plugs of the first and second turbulent flowing materials in the discharge lines by using the first and second pressure transducers, respectively;
   (f) adjusting the gas pressure in the first and second gas reservoirs such that the materials are capable of being propelled at a velocity effective to cause overlapping contact between the materials; and
   (g) repeating steps (a)–(d) after adjusting the gas pressure.

2. The method of claim 1 wherein the first and second material reservoirs via the first and second discharge lines, respectively, communicate with the mixing head, whereby the first and second materials are intimately admixed to form a gas/liquid dispersion in the mixing head.

3. The method of claim 2 wherein the mixing head is in communication with said shaping means.

4. The method of claim 3 wherein the first and second material reservoirs communicate with a gas disentrainment chamber prior to the material entering into said shaping means.

5. The method of claim 4 further comprising discharging the admixed material into the shaping means after a period of time in the gas disentrainment chamber in which gas bubbles in the admixed material are allowed to rise in a head space above the liquid material.

6. The method of claim 5 further comprising providing at least one source of gas under pressure in operating communication with a first gas pressure regulating means and in operating communication with a second gas pressure regulating means, said first and second gas pressure regulating means in operating communication with the first and second gas reservoirs; and bleeding sufficient gas from the source of gas under pressure through the first and second gas pressure regulating means, respectively, after propelling the materials from the material reservoirs to discharge into the shaping means the gas/liquid dispersion deposited in the gas disentrainment chamber;

whereby the materials are discharged, after a time, into the shaping means,

7. The method of claim 6 wherein the first and second gas reservoirs each have an inlet and an outlet, and wherein first and second valves in communication with the material storage inlets of the first and second material reservoirs, respectively;

the first and second gas reservoirs being connected to the first and second gas pressure regulators respectively, by means of the inlets to said gas reservoirs; the first and second gas reservoirs being connected to the first and second valves, respectively, by means of the outlets from said gas reservoirs, thereby providing selective communication between first and second gas reservoirs and the first and second material reservoirs, respectively;

introducing into each of the first and second gas reservoirs the predetermined volume of the gas at the predetermined gas pressures; and opening the first and second valves to provide communication between the first and second gas reservoirs and the first and second material reservoirs respectively, thereby introducing gas from the first and second gas reservoirs into the first and second material reservoirs, respectively.

8. The method of claim 7 wherein the first and second valves are three-way valves, and wherein at least one material supply means in communication with the valves.

9. The method of claim 7 further comprising providing first and second calibration means, and third and fourth valves in communication with the material storage outlets of the first and second material reservoirs, respectively;

said third valve also being in communication with the first calibration means and the mixing head, and said fourth valve also being in communication with the second calibration means and the mixing head, the third and fourth valves providing selective communication between the first and second material reservoirs, respectively, and the mixing head and the first and second calibration means, respectively;

before step (c) performing a calibration operation comprising opening the third and fourth valves to provide communication between the first and second material reservoirs and first and second calibration means respectively, thereby discharging the predetermined quantity of the material from each material reservoir through the first and second valves, respectively, and into the first and second calibration means respectively; determining the volume quantity of material in the first and second calibration means; repeating the calibration operation until the desired ratio of materials is obtained in the first and second calibration means 10. The method of claim 9 wherein the first and second calibration means each comprise an external discharge means having an inlet, an outlet and a receiver, the external discharge means being in communication with the third and fourth valves by means of the inlets to said external discharge means, and in association with the receivers by means of the outlets to said external discharge means.

11. The method of claim 1 wherein the first and second discharge means each further comprises a nozzle located immediately prior to the mixing head, said nozzles being of suitable configuration to increase the turbulent flow of the materials into the mixing head.

12. The method of claim 1 wherein said shaping means defines a generally plate-like cavity.

13. The method of claim 1 wherein the gas pressure is provided by a gas which is generally unreactive in the mixing of the materials.

14. The method of claim 1 including the step of maintaining the first and second materials in the first and second material reservoirs at a predetermined temperature.

* * * * *